Oct. 6, 1931.  C. A. HENNEUSE  1,825,693
TRACTOR BELT LINK
Filed May 19, 1927    2 Sheets-Sheet 1

INVENTOR.
Clarence A. Henneuse.
BY
Fay, Oberlin & Fay
ATTORNEYS

Oct. 6, 1931.  C. A. HENNEUSE  1,825,693
TRACTOR BELT LINK
Filed May 19, 1927   2 Sheets-Sheet 2

INVENTOR.
Clarence Alvin Henneuse
BY
Fay, Oberlin & Fay
ATTORNEYS

Patented Oct. 6, 1931

1,825,693

UNITED STATES PATENT OFFICE

CLARENCE ALVIN HENNEUSE, OF BUCYRUS, OHIO

TRACTOR BELT LINK

Application filed May 19, 1927. Serial No. 192,697.

The present invention, relating as indicated to a tractor belt link, is particularly directed to an improved link for tractor belts of a construction adapting the connected links to support themselves against sagging so that no intermediate supporting rollers, guides or the like are required in the use of such a belt between the end or driving pulleys or wheels, and also for the purpose of preventing upward deflection of that portion of the track which engages the ground between the end of driving pulleys, thereby increasing the effective grip of the tractor links upon the ground and decreasing the unit maximum pressure between the ground and the engaging surfaces of the links.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:—

Figure 1:
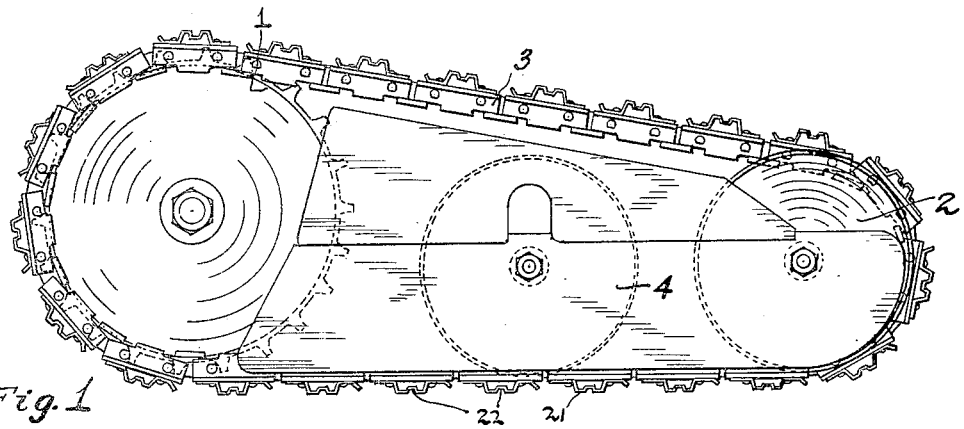
Figure 2:
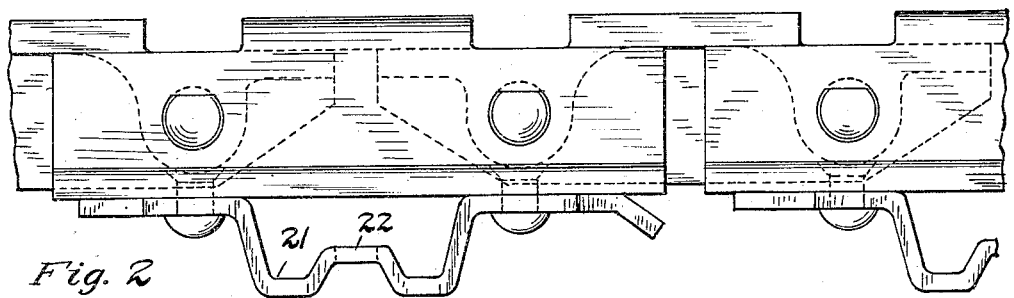
Figure 3:
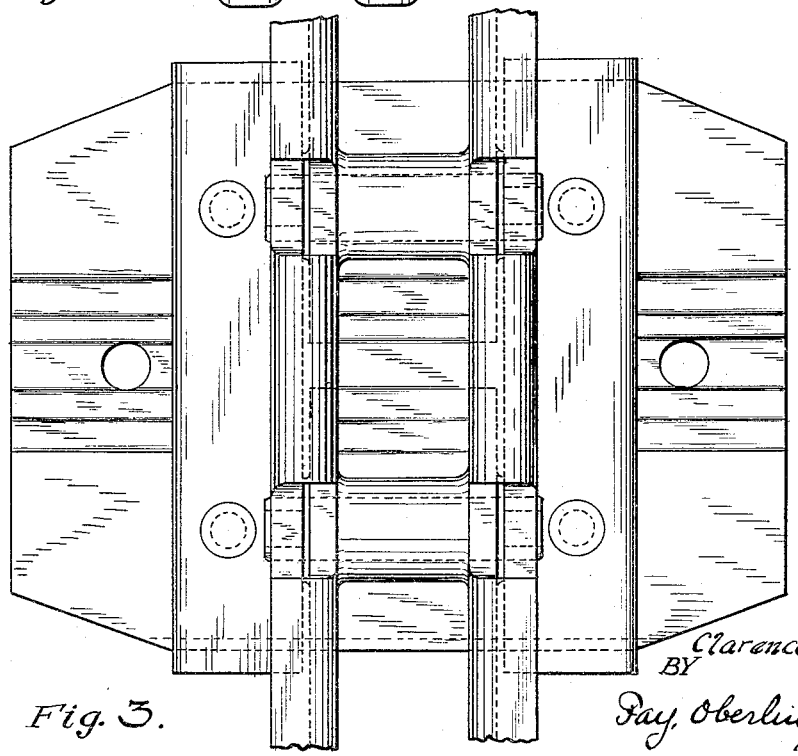
Figure 4:
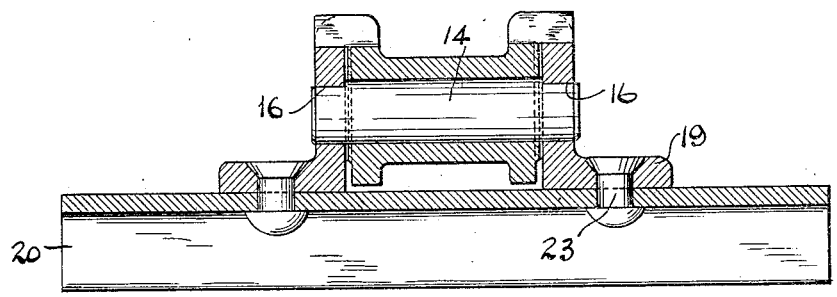

Fig. 1 is a side elevation of a complete tractor belt embodying my improved invention in operative relation upon suitable driving sprockets or wheels; Fig. 2 is a side elevation of a portion of a belt; Fig. 3 is an inner plan view of two of the links of my improved belt, together with a tread or wearing element secured thereto; Fig. 4 is a transverse sectional view of the device of Fig. 3; and Fig. 5 is a view in perspective looking at the belt from the lower or sprocket engaging side.

Referring now to Fig. 1 there are shown sprocket wheels 1 and 2, upon which is mounted a continuous tread 3. The sprocket wheels may of course be secured in any suitable frame mechanism and a single relatively large idler 4 may be employed intermediate the elements 1 and 2 for partially reinforcing that portion of the track which is engaged upon the ground between the wheels 1 and 2.

Figure 5:
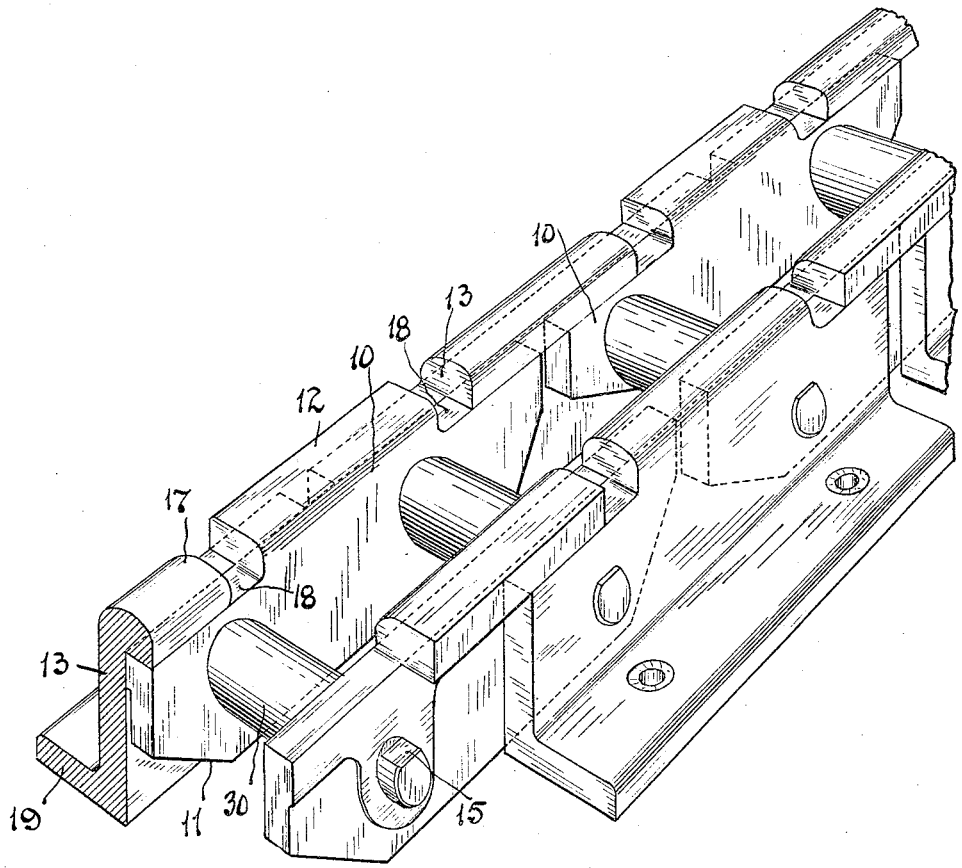

My improved tractor belt consists of alternating links of two types, which can best be seen in Fig. 5. In that figure there are shown links 10 provided with beveled lower corners 11 for permitting the pivoting of the links toward each other, as they are required to do in passing over the sprockets 1 and 2, the links also having outwardly extending flanges 12 adapted to overlie and engage with the adjacent ends of other alternate links 13. The two spaced side plates which constitute the link 10 are rigidly connected by means of integral hollow tubular elements 30 which are cylindrical in transverse section, and which are adapted to register with corresponding openings formed in the side plates 13 which constitute the alternate or adjacent links. Pins 14 are received within the tubular elements 30 and are rotatable therein, but are provided with flattened ends 15 which engage in correspondingly formed openings 16 in the plates 13 of the next adjacent links, and are thus nonrotatable in these links, although allowing of pivotal movement between each two adjacent links.

The links 13 are provided with inwardly extending flanges 17 which overlie and contact with the upper corners or surfaces 18 on the links 10, the inner surfaces of the flanges 17 lying in substantially the same plane as the inner surfaces of the outwardly extending flanges 12 on the links 10, as best seen in Fig. 5. The series of links 13 are provided with outwardly extending flanges 19, to which are secured wear plates or tread elements 20, which may be of any suitable type, but as here shown consist of sheets bent to form a channel 21 (see Fig. 2) having an inwardly extending recess 22 in its center. These wear plates are secured to the flanges 19 on the links 13 by means of rivets 22, or other suitable means.

From the construction of the two series of links it will be seen (Fig. 5) that each pair of links 10 overlap inwardly and are themselves overlapped exteriorly by the adjacent links 13, both types of links having flanges which then overlie and contact a portion of the other surface of the other type of link so that these links form mutual supports for each other, and any pivotal movement inwardly, that is, toward the center of the tractor belt, being resisted by the engagement of these flanges against the bodies of the next adjacent links, and thus providing a self-supporting and self-locking belt which has entire freedom of movement in an outward direction, that is, away from the center of the tractor belt, but substantially no freedom of movement inwardly from the plane of the belt itself. By reference to Fig. 1 it will be seen that the upper portion of the belt, for example, supports itself between the points of engagement of the belt over the sprockets 1 and 2, and similarly the lower portion of the belt, which is engaged with the ground, supports itself against upward bulging and provides a continuous tread for the full distance between the sprockets for engagement with the ground, and without the necessity for providing any supporting rollers or guides for maintaining this engagement, thus making it possible to greatly simplify the tread apparatus and to lighten the entire machine.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In an endless track, the combination of tread shoes, longitudinally contiguous links consisting of spaced members having laterally projecting flanges extending longitudinally medially on one edge thereof, connecting means for said links consisting of angle members each having one leg in contact with one of said link members, and the other leg secured to a tread shoe, said laterally projecting flanges overlapping said first-mentioned legs of the angle members, registering openings in said link members and said connecting members, and connecting pins carried in said openings.

2. In an endless track, the combination of tread shoes, longitudinally contiguous links consisting of spaced member having laterally projecting flanges extending longitudinally medially on one edge thereof, connecting means for said links comprising pairs of angle members, each member of a pair having one leg in contact with one of said link members and the other leg secured to a shoe, said first mentioned legs having laterally projecting flanges extending longitudinally medially on one edge thereof and overlapping the edges of the links connected by said angle members for restraining relative movement in one direction between adjacent links, said first mentioned laterally projecting flanges overlapping the ends of the first mentioned legs of the angle members, registering openings in said contiguous links and said pairs of angle members, and connecting pins carried in said openings.

Signed by me this 7th day of May, 1927.
CLARENCE ALVIN HENNEUSE.